United States Patent [19]

Harper et al.

[11] 4,356,366
[45] Oct. 26, 1982

[54] CIRCUITRY COMPONENT

[75] Inventors: William P. Harper, Phoenix; Michael J. Taylor, Mesa, both of Ariz.

[73] Assignee: Rogers Corporation, Rogers, Conn.

[21] Appl. No.: 156,759

[22] Filed: Jun. 5, 1980

[51] Int. Cl.³ .......................... H01N 3/12; H01B 1/06
[52] U.S. Cl. .................... 200/159 B; 252/500; 252/512; 252/514; 252/511; 106/1.05; 106/20; 200/265
[58] Field of Search ............... 252/500, 512, 514, 518; 106/20; 200/1.05, 265, 159 B; 260/37 EP, 37 M, 37 N, 40 TN

[56] References Cited

U.S. PATENT DOCUMENTS

| | | | |
|---|---|---|---|
| 2,866,057 | 12/1958 | Peck | 252/503 |
| 3,891,450 | 6/1975 | Trease | 252/518 |
| 3,962,143 | 6/1976 | Hitch et al. | 252/518 |
| 3,973,981 | 8/1976 | Miyatake et al. | 106/20 |
| 3,989,644 | 11/1976 | Bolon et al. | 252/514 |
| 3,992,212 | 11/1976 | Youtsey et al. | 106/20 |
| 4,020,206 | 4/1977 | Beil | 252/514 |
| 4,029,605 | 6/1977 | Kosiorek | 252/514 |
| 4,065,316 | 12/1977 | Baron et al. | 106/20 |
| 4,111,916 | 9/1978 | De Blasi | 106/20 |
| 4,235,944 | 11/1980 | Felten | 252/514 |
| 4,243,710 | 1/1981 | Magrini et al. | 252/514 |
| 4,264,477 | 4/1981 | Seeger et al. | 252/503 |

*Primary Examiner*—Joseph L. Schofer
*Assistant Examiner*—J. L. Barr
*Attorney, Agent, or Firm*—David S. Fishman

[57] ABSTRACT

An improved method of manufacturing electrical and electronic circuits is provided wherein an improved conductive ink is employed to define the pathways of current flow. This improved conductive ink is comprised of conductive particles, thermosetting binder and a multifunctional isocyanate. The isocyanate provides cross-linking between the conductive ink binder and the surface upon which the ink is applied and establishes a bond with enhanced moisture durability.

10 Claims, 4 Drawing Figures

CIRCUITRY COMPONENT

BACKGROUND OF THE INVENTION

(1) Field of the Invention

The present invention relates to the manufacture of electrical and electronic circuits and particularly to the fabrication of keyboard components. More specifically, this invention is directed to switch arrays wherein switch contacts are defined by a conductive ink. Accordingly, the general objects of the present invention are to provide novel and improved articles of such character.

(2) Description of the Prior Art

Switch arrays, for example closely spaced switches formed employing "printed" circuit techniques and intended for utilization in miniaturized keyboards, are well known in the art. Conductive inks are well known in the art. The typical prior conductive-silver-ink formulation contains a thermosetting binder which serves as a carrier for the silver particles. The binder may, for example, comprise an epoxy/urethane mixture. The conductive ink may be applied to a nonconductive substrate by any suitable technique to establish a current path or paths between components of an electrical or electronic device, and the binder is thereafter cured by the application of heat.

The conductive inks disclosed in the prior art exhibit characteristics which make their use under certain conditions disadvantageous. For example, keyboards fabricated by "printed" circuit techniques must often be capable of withstanding "super soak" conditions, 96 hours at 95% relative humidity and 65° Celsius without degradation. Prior art conductive inks exhibit poor moisture durability. The bond between these inks and the various nonconductive substrates over which they are applied to form a conductive pathway is known to degrade under "super soak" conditions.

The prior art also discloses the use of conductive inks to selectively establish contact between portions of a circuit which has been etched from a copper to nonconductive substrate laminate. Here the laminate has undergone various wet processing manufacturing steps such as etching and stripping operations. Because of these manufacturing steps, the now exposed cured adhesive which had been used to bond the copper to the substrate has been subjected to chemical attack. Because of prior art conductive inks have had poor adhesion to chemically attacked adhesives, and because the favored method of defining a contact array for a keyboard is chemical etching of a copper film on a substrate, conductive inks have not previously been successfully employed in keyboard applications.

SUMMARY OF THE INVENTION

The present invention overcomes the above-discussed disadvantages and other deficiencies of the prior art by providing a novel and improved switch array which employs a unique conductive ink. A conductive ink in accordance with the present invention is characterized by the establishment of a bond with the substrate to which it has been applied which has enhanced moisture durability. Also, a conductive ink in accordance with the present invention is characterized by the establishment of an improved bond to an exposed cured adhesive layer, on a nonconductive substrate, which has been subjected to chemical attack.

In accordance with the present invention, a low molecular weight multifunctional isocyanate, preferably a difunctional isocyanate, is added to the binder material of the conductive ink. In accordance with the preferred embodiment, toluene diisocyanate or isophorone diisocyanate is used. The isocyanate is added in quantities which comprise less than 10% by weight of the binder. The isocyanate employed in accordance with the present invention is characterized by an isocyanate to hydroxyl ratio, which is a function of the composition of the binder, in the range of 0.01:1 to 1.5:1.

BRIEF DESCRIPTION OF THE DRAWINGS

The present invention may be better understood and its numerous objectives and advantages will become apparent to those skilled in the art, by reference to the accompanying drawings, wherein like reference numerals refer to like elements in several FIGURES and wherein.

DESCRIPTION OF THE PREFERRED EMBODIMENT

Figure 1:
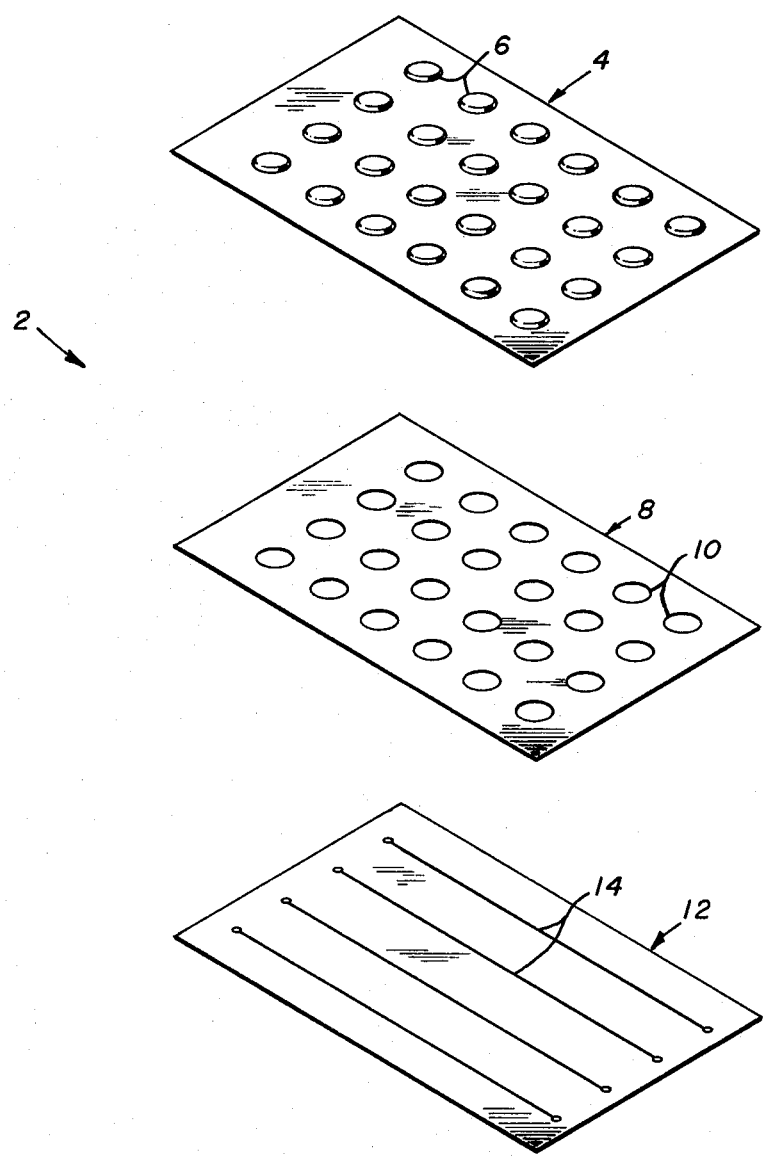
FIG. 1 is an exploded view of the components of a switch array for a keyboard assembly in accordance with the invention.

Referring to FIG. 1, a switch array is indicated generally at 2. The article of FIG. 1 includes a top insulating sheet 4 provided with protrusion 6 which, when snapped through center, make contact with the conductive pattern 14 located on bottom sheet 12. Separator sheet 8 is placed between top sheet 4 and bottom sheet 12. Holes 10 are provided within separator sheet 8 so as to allow protrusion 6 to make contact with conductive pattern 14.

Figure 2:
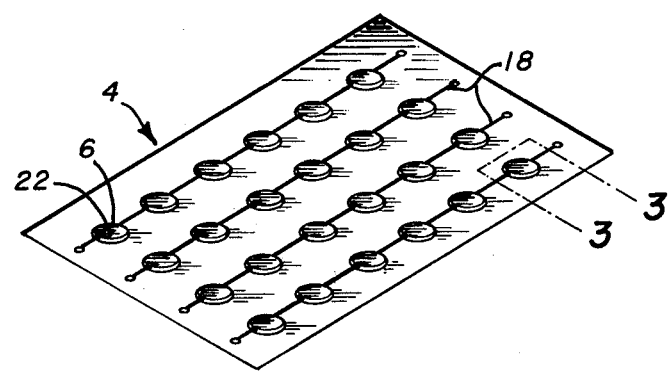
FIG. 2 is a bottom view of the upper member of the article shown in FIG. 1.

Now referring to FIG. 2, the bottom view of top insulating sheet 4 is shown. Sheet 4 has applied to it conductive pattern 18. The conductive pattern 18 partially extends into the concave side of protrusions 6 and the conductive pattern 18 is then electrically connected by conductive ink 22.

Figure 3:
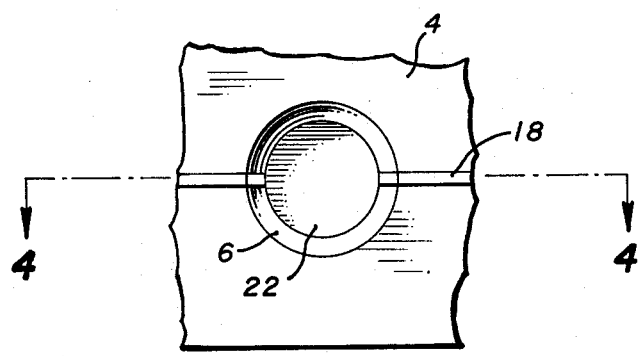
FIG. 3 is a view taken along line 3—3 of FIG. 2.
Figure 4:
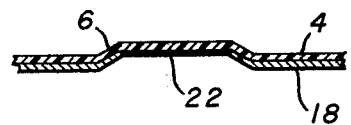
FIG. 4 is a view taken along line 4—4 of FIG. 3.

Both FIG. 3 and FIG. 4 show an enlarged view of a protrusion 6 showing a portion of conductive pattern 18 entering the protrusion 6 and then electrically connected by conductive ink 22.

The conductive ink 22 of the present invention comprises a binder, in the form of a thermosetting adhesive, electrically conductive particles, for example silver, and a multifunctional isocyanate, preferably a difunctional isocyanate, having a low molecular weight. In the formation of the ink, the isocyanate will typically be added to a previously prepared conductive ink, with the amount added, as a percent by weight of the binder, being a function of the characteristics of the binder.

In one preferred embodiment of the present invention, isophorone diisocyanate, having a molecular weight of 222, was dissolved in a screening solvent, butyl cellosolve acetate, with the isophorone diisocyanate being in a concentration of 10% by volume of the solution. This solution was then added to a commercially available conductive ink, comprised of silver particles and epoxy/urethane binder. This commercially available conductive ink is sold under the name Uniset 927-13 by Amicon Corporation, 25 Hartwell Avenue, Lexington, Mass. 02173.

Three test samples of the above composition were prepared with the isophorone diisocyanate to binder weight ratios of 3:100, 5:100, and 10:100, respectively. These test samples and a control sample of the conductive ink were applied to a testing surface. This surface comprised a nonconductive substrate which had been previously bonded to copper and was subsequently etched clean. The above samples were applied over this previously cured adhesive in the form of a thixotropic paste by screen printing.

The testing surface along with the four screen printed samples of conductive ink were subjected to "super soak" conditions to determine at what point in time there was a failure of bond integrity, per a standard I.P.C. tape test. The result of the tests are as follows: the control sample failed at two hours; the sample with 3% by weight of isophorone diisocyanate failed at 6 hours, the sample with 5% by weight of the isophorone diisocyanate failed after 64 hours; and the sample with 10% by weight of the isophorone diisocyanate had not failed at termination of the standard 96 hour test. All four samples retained their functional flexibility, scratch resistance and electrical conductivity prior to experiencing bond failure. A further test with the same test results was run substituting tolylene diisocyanate with a molecular weight of 174.16 for isophorone diisocyanate.

It is theorized that by adding an excess of the multifunctional or difunctional isocyanate a nonequilibrium of active hydroxyl sites is created. The isocyanate in the conductive ink binder would then migrate to surface of the substrate and cross-link the old cured adhesive surface with the thermosetting binder. It is further theorized that the reactivity differential between the isocyanate groups on the isophorone diisocyanate result in one group only reacting with the cured adhesive layer and the other only reacting with the adhesive binder, thus crosslinking the two. These theories are neither confirmed nor suggested as the only theories and should not be taken in any manner to limit the scope of the present invention.

It has been found that the present invention may comprise, depending on processing conditions and with particular interest in preventing toxic vapors, a multifunctional or difunctional isocyanate, either monomeric aliphatic or aromatic, with a molecular weight ranging from 150–350 and a low vapor pressure relative to other low molecular weight isocyanates at standard temperature and pressure. Furthermore, preferred ratio of isocyanate to hydroxyl sites is 0.01:1 to 1.5:1. The following is a partial list of multifunctional isocyanates that may be employed with the present invention; toluene diisocyanate, hexamethylene diisocyanate, triphenylmethane-p,p', p'''-triisocyanate, diphenylmethane-p,p' diisocyanate, dianisidine diisocyanate, thiophosphoric acid tris (p-isocyanatophenyl ester), and trimethyl-hexamethylene diisocyanate.

The above isocyanates may be added to any conductive ink wherein the binder is epoxy, urethane, polyester, or adduct or combinations of these compounds. The cured adhesive layer may also be one of the above compounds or compositions. These adhesive systems are characterized as easily hydrolyzed and thus are subject to chemical attack after wet processing or if subject to high humidity conditions and will lose bond integrity, as a result. Any binder having hydroxyl functionality or the ability to form hydroxyl groups may be used in the present invention.

While preferred embodiments have been shown and described, various substitutions and modifications may be made thereto without departing from the spirit and scope of the invention. Accordingly, it is to be understood that the present invention has been described by way of illustration and not limitation.

What is claimed is:

1. An improved switch array for use in a keyboard assembly comprising:

means defining first contacts of the switches of the array, said first contact defining means including a planar non-conductive substrate having a plurality of conductors disposed on a first surface thereof; and means defined second contacts of the switches of the array, said second contact defining means including:

a flexible non-conductive substrate, said flexible substrate defining a second plane parallel to the plane of the substrate of said first contact defining means, said flexible substrate having a plurality of protusions therein, said protusions extending away from said first contact defining means and being configured to snap through said second plane towards said first contact defining means upon application of force thereto, said protusions being in registration with conductors on the substrate of said first contact defining means;

a plurality of spacially separated conductive regions on a first surface of said flexible substrate, said first surface facing said first surface of said first contact defining means, said conductive regions being spacially separated from said plurality of conductors, said conductive regions have been formed by the selective chemical removal of adhered conductive material from said first surface of said flexible substrate, each of said protusions having conductive regions extending partly onto the wall thereof from a pair of spaced locations; and a conductive ink on the wall of said protusions and at least partly overlaping adhesive from which conductive material has been chemically removed, said conductive ink bridging the space between the conductive regions which extend part way into the protusions to establish a current path therebetween, said conductive ink also functioning as a moveable switch contact and contacting a conductor on said first contact defining means when the associated protusion is caused to snap through said second plane, said conductive ink including conductive particles in a thermosetting binder, said thermosetting binder being selected from the group of binders having hydroxyl functionality and the ability to form hydroxyl groups, said conductive ink further including a multi-functional isocyanate having a molecular weight in the range of 150 to 350 and a low vapor pressure relative to other low molecular weight isocyanates at standard temperature and pressure, said isocyanate comprising about three percent to about ten percent by weight of the binder.

2. The article of claim 1 wherein the multifunctional isocyanate is a diisocyanate.

3. The article of claim 2 wherein the isocyanate is isophorone diisocyanate.

4. The article of claim 2 wherein the isocyanate is toluene diisocyanate.

5. The article of claim 1 wheren the isocyanate is selected from the group consisting of:
toluene diisocyanate, hexamethylene diisocyanate, triphenylmethane-p, p", p'''-triisocyanate, diphenylmethane-p, p' dissocyanate, dianisidine diisocyanate, thiophosphoric acid tris (p-isocyanatophenyl ester) and trimethyl-hexamethylene diisocyanate.

6. The article of claim 1 wherein the thermosetting binder is selected from the group consisting of epoxide, polyester, urethane, any combination of the above and any adduct of the above.

7. The article of claim 1 wherein the isocyanate-hydroxyl ratio is between 0.01:1 to 1.5:1.

8. The article of claim 5 wherein the thermosetting binder is selected from the group consisting of epoxide, polyester, urethane, any combination of the above and any adduct of the above.

9. The article of claim 6 wherein the multifunctional isocyanate is a diisocyanate.

10. The article of claim 9 wherein the isocyanate-hydroxyl ratio is between 0.01:1 to 1.5:1.

* * * * *

UNITED STATES PATENT AND TRADEMARK OFFICE
CERTIFICATE OF CORRECTION

PATENT NO. : 4,356,366
DATED : October 26, 1982
INVENTOR(S) : William P. Harper and Michael J. Taylor It is certified that error appears in the above-identified patent and that said Letters Patent are hereby corrected as shown below:

IN THE CLAIMS:

Column 4, line 15 "defined" should be --defining--

Column 4, line 36 "have" should be --having--

Signed and Sealed this

Twenty-first Day of February 1984

[SEAL]

Attest:

GERALD J. MOSSINGHOFF

Attesting Officer     Commissioner of Patents and Trademarks